United States Patent [19]

Campbell et al.

[11] 4,161,474
[45] Jul. 17, 1979

[54] BIS-(ALKYLAMINOPHENOXY)ALKANES AS ANTIDEGRADANTS FOR RUBBER

[75] Inventors: Robert H. Campbell, Akron; Gene R. Wilder, Medina, both of Ohio

[73] Assignee: Monsanto Company, St. Louis, Mo.

[21] Appl. No.: 854,671

[22] Filed: Nov. 25, 1977

[51] Int. Cl.² ............................................. C08K 5/18
[52] U.S. Cl. ............................ 260/45.9 QA; 260/571; 260/808
[58] Field of Search ............... 260/45.9 QA, 45.9 QB, 260/571, 808

[56] References Cited

U.S. PATENT DOCUMENTS 2,103,188  12/1937  Semon et al. ................... 260/808

FOREIGN PATENT DOCUMENTS 749907  6/1956  United Kingdom.
770410  3/1957  United Kingdom.

OTHER PUBLICATIONS

J. Chem. Soc. (1958) 3298–3313 Ashley et al.

Primary Examiner—V. P. Hoke
Attorney, Agent, or Firm—Gordon B. Seward

[57] ABSTRACT

Vulcanizable or vulcanized diene elastomers containing stabilizing amounts of certain bis-alkylaminophenoxyalkyl antidegradants show resistance to ozone attack. A novel class of bis-alkylaminophenoxyalkane compounds is also disclosed.

7 Claims, No Drawings

BIS-(ALKYLAMINOPHENOXY)ALKANES AS ANTIDEGRADANTS FOR RUBBER

BACKGROUND OF THE INVENTION

This invention relates to vulcanized or vulcanizable diene elastomers containing stabilizing amounts of certain antidegradants. The invention also relates to a novel class of compounds which are especially effective as antidegradants for polymers.

In U.S. Pat. No. 2,103,188, certain compounds are disclosed as antioxidants for rubber, among other substances. One such compound is 1,2-bis-p-anilinophenoxy ethane. Although this compound is shown to be effective antioxidant, it has now been found to have little or no effect in protecting diene elastomers from ozone attack.

SUMMARY OF THE INVENTION

It has now been found that vulcanized or vulcanizable diene elastomers which withstand ozone attack can be produced which incorporate therein stabilizing quantities of an antidegradant according to the formula:

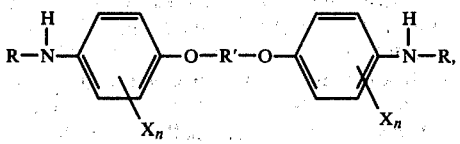

wherein the Rs are the same or different secondary alkyl radicals, including cyclic alkyls, of from 3 to 8 carbon atoms, R' is a divalent straight or branched chain alkyl radical of from 1 to 6 carbon atoms, X is a substituent which can be lower alkyl or halogen, and n is an integer of 0 to 4. The diene elastomers thus stabilized show excellent resistance to degradation by ozone under both static and dynamic conditions. While waxes provide significant protection from ozone under static conditions, antidegradants are required to supplement the static protection and to provide protection under conditions in which the elastomer is strained or continually flexed.

Another embodiment of the invention relates to a novel class of compounds having the following formula:

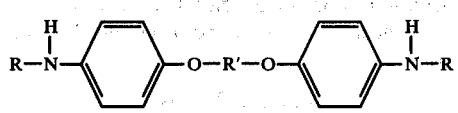

wherein the Rs are secondary open chain alkyl hydrocarbon radicals of from 5 to 8 carbon atoms, and R' is $-CH_2-$ or $-CH_2-CH_2-$. The compounds are especially effective as antidegradants in diene elastomer compositions.

DETAILED DESCRIPTION OF THE INVENTION

The antidegradants which are incorporated in the stabilized diene elastomers have been generally defined above. Examples of such antidegradant compounds include those in which R' is $-CH_2-CH_2-$ and n is zero, for example:

1. 1,2-bis [4-(isopropylamino)phenoxy] ethane
2. 1,2-bis [4-(1-methylpropylamino)phenoxy] ethane
3. 1,2-bis [4-(1,3-dimethylbutylamino)phenoxy] ethane
4. 1,2-bis [4-(1,2-dimethylpropylamino)phenoxy] ethane
5. 1,2-bis [4-(1,4-dimethylpentylamino)phenoxy] ethane
6. 1,2-bis [4-(1-methylpentylamino)phenoxy] ethane
7. 1,2-bis [4-(1-methylbutylamino)phenoxy] ethane
8. 1,2-bis [4-(1-methylhexylamino)phenoxy] ethane
9. 1,2-bis [4-(1-ethylpropylamino)phenoxy] ethane
10. 1,2-bis [4-(1-ethylbutylamino)phenoxy] ethane
11. 1,2-bis [4-(1-ethyl-3-methylbutylamino)phenoxy]ethane
12. 1,2-bis [4-(1-ethyl-3-methylpentylamino)phenoxy]ethane Similarly, when R' is $-CH_2-CH_2-CH_2-$, and n is zero, the following compounds are included:

13. 1,3-bis [4-(isopropylamino)phenoxy] propane
14. 1,3-bis [4-(1-methylpropylamino)phenoxy] propane
15. 1,3-bis [4-(1,3-dimethylbutylamino)phenoxy] propane
16. 1,3-bis [4-(1,2-dimethylpropylamino)phenoxy] propane
17. 1,3-bis [4-(1,4-dimethylpentylamino)phenoxy] propane
18. 1,3-bis [4-(1-methylpentylamino)phenoxy] propane
19. 1,3-bis [4-(1-methylbutylamino)phenoxy] propane
20. 1,3-bis [4-(1-methylhexylamino)phenoxy] propane
21. 1,3-bis [4-(1-ethylpropylamino)phenoxy] propane
22. 1,3-bis [4-(1-ethylbutylamino)phenoxy] propane
23. 1,3-bis [4-(1-ethyl-3-methylbutylamino)phenoxy] propane
24. 1,3-bis [4-(1-ethyl-3-methylpentylamino)phenoxy]propane Again, when R' is $-CH_2-$, the following compounds are included:

25. bis [4-(isopropylamino)phenoxy] methane
26. bis [4-(1-methylpropylamino)phenoxy] methane
27. bis [4-(1,3-dimethylbutylamino)phenoxy] methane
28. bis [4-(1,2-dimethylpropylamino)phenoxy] methane
29. bis [4-(1,4-dimethylpentylamino)phenoxy] methane
30. bis [4-(1-methylpentylamino)phenoxy] methane
31. bis [4-(1-methylbutylamino)phenoxy] methane
32. bis [4-(1-methylhexylamino)phenoxy] methane
33. bis [4-(1-ethylpropylamino)phenoxy] methane
34. bis [4-(1-ethylbutylamino)phenoxy] methane
35. bis [4-(1-ethyl-3-methylbutylamino)phenoxy] methane
36. bis [4-(1-ethyl-3-methylpentylamino)phenoxy] methane Other compounds which are useful include:

37. 1,6-bis [4-(isopropylamino)phenoxy] hexane
38. 1,6-bis [4-(1-methylpropylamino)phenoxy] hexane
39. 1,6-bis [4-(1,2-dimethylpropylamino)phenoxy] hexane
40. 1,6-bis [4-(1-methylbutylamino)phenoxy] hexane
41. 1,6-bis [4-(1-ethylpropylamino)phenoxy] hexane
42. 1,5-bis [4-(isopropylamino)phenoxy] pentane
43. 1,5-bis [4-(1-methylpropylamino)phenoxy] pentane
44. 1,5-bis [4-(1,3-dimethylbutylamino)phenoxy] pentane
45. 1,5-bis [4-(1,2-dimethylpropylamino)phenoxy] pentane
46. 1,5-bis [4-(1-methylpentylamino)phenoxy] pentane
47. 1,5-bis [4-(1-methylbutylamino)phenoxy] pentane
48. 1,5-bis [4-(1-ethylpropylamino)phenoxy] pentane
49. 1,5-bis [4-(1-ethylbutylamino)phenoxy] pentane
50. 1,4-bis [4-isopropylamino)phenoxy] butane
51. 1,4-bis [4-(1-methylpropylamino)phenoxy] butane 52. 1,4-bis [4-(1,2-dimethylpropylamino)phenoxy] butane
53. 1,4-bis [4-(1,3-dimethylbutylamino)phenoxy] butane
54. 1,4-bis [4-(1,4-dimethylpentylamino)phenoxy] butane
55. 1,4-bis [4-(1-methylpentylamino)phenoxy] butane
56. 1,4-bis [4-(1-methylbutylamino)phenoxy] butane
57. 1,4-bis [4-(1-methylhexylamino)phenoxy] butane
58. 1,4-bis [4-(1-ethylpropylamino)phenoxy] butane
59. 1,4-bis [4-(1-ethylbutylamino)phenoxy] butane
60. 1,4-bis [4-(1-ethyl-3-methylbutylamino)phenoxy] butane
61. 1,3-bis [4-(isopropylamino)phenoxy] 2,2-dimethyl propane
62. 1,3-bis [4-(1,3-dimethylbutylamino)phenoxy] 2,2-dimethylpropane
63. 1,3-bis [4-(1-methylpropylamino)phenoxy] 2,2-dimethylpropane
64. 1,3-bis [4-(1,2-dimethylpropylamino)phenoxy] 2-ethylpropane
65. bis [4-(cyclohexylamino)phenoxy] methane
66. 1,2-bis [4-(cyclohexylamino)phenoxy] ethane
67. 1,3-bis [4-(cyclohexylamino)phenoxy] propane
68. 1,4-bis [4-(cyclohexylamino)phenoxy] butane
69. 1,5-bis [4-(cyclohexylamino)phenoxy] pentane
70. 1,6-bis [4-cyclohexylamino)phenoxy] hexane
71. 1,3-bis [4-(cyclohexylamino)phenoxy] 2,2-dimethylpropane
72. 1,3-bis [4-(cyclohexylamino)phenoxy] 2-ethylpropane
73. 1,2-bis [4-(1,3-dimethylbutylamino)-2-methylphenoxy] ethane
74. 1,4-bis [4-(isopropylamino)-2-chlorophenoxy] butane In general, the elastomers in which the above antidegradants are incorporated are sulfur-vulcanizable diene rubbers. Those containing more than 50% diene hydrocarbon are preferred. The group of rubbers includes natural rubbers, styrene-butadiene copolymer rubber and the various stereospecific polymerized dienes; for example, cis-polybutadiene and cis-polyisoprene. The compositions are also useful in diene rubbers of low unsaturation such as butyl rubber and ethylene-propylenediene terpolymer rubber (EPDM). The amount to use will vary depending upon the particular formulation and the purpose of the compounder; but, in general, the amounts will fall within the range of 0.1 to 5% of the rubber content.

Stereospecific rubbers are normally obtained as cements and it is important to add antidegradant to the organic solvent composition immediately after polymerization has been completed because these rubbers deteriorate rapidly unless adequately protected immediately after polymerization. The antidegradants are also suited for addition to latex, for example, to protect the rubber phase of SBR rubber.

In general, antidegradants of the invention are produced by first reacting p-nitrophenol with an alkali-metal hydroxide to form the alkali-metal p-nitrophenate, then reacting the latter compound with an $\alpha$-$\omega$ dichloro- (or dibromo-) alkane of 1-6 carbon atoms. The product of this reaction is then reductively alkylated with a ketone having from 3-8 carbon atoms to form the preferred antidegradant. Other methods for preparing these compounds and related compounds are disclosed in British Pat. No. 749,907.

Rubber ozone resistance data for the product of this invention is illustrated by a method published by Decker and Wise, The Stress Relaxation Method for Measuring Ozone Cracking, *Rubber World*, April 1962, page 66. The equipment comprises an oven serving as an ozone cabinet filled with ozone generating equipment and racks for both static and dynamic testing. Static racks handle stocks at strains of 5, 10, 20, 30 and 40%. The dynamic rack is a reciprocal mechanism which imparts a 25% strain to the rubber test piece on movement of a top plate which moves vertically with respect to a stationary bottom plate. The mechanism is driven at a rate of 90 cycles per minute by a gear mounted on the outside of the cabinet. The test pieces are 2-inch long T-50 (ASTM D599-55) specimens died from standard stress strain test sheets (ASTM D15-57T). They are mounted by placing the ends in radial slots milled into the edges of circular plates of the racks. The tab ends fit into circumferential grooves machined into the outer surfaces of the plates.

The stress relaxation method is based on the principle that the effective cross-sectional area of a small test piece of rubber is reduced by ozone cracking. The extent of cracking in a test piece is determined by measuring the forces required to extend the test piece 100% before and after exposure to ozone. The ozone concentration for the test is 25 parts ozone/100 million parts air. As the strip begins to crack, the number of stress supporting rubber chains decreases and the force required to extend the strip 100% is reduced. The ratio of this force to the original force is calculated at approximately 16-hour intervals of exposure to ozone. The graph of force vs. time is essentially a straight line and the time required for obtaining 90%, 80% and 70% respectively of the original force is determined from the graph. The ability of the rubber to resist ozone attack is evaluated by comparison of these times to times for suitable controls to reach corresponding percent of the original force. Longer times indicate better ozone resistance of the rubber stock. The intermittent test comprises 2-hour cycles during which the specimens are exposed dynamically 15% of the time and during the remainder of the time are exposed statically at 25% strain.

DESCRIPTION OF PREFERRED EMBODIMENTS

The novel compounds of the invention, which have been defined above, include compounds 3 to 12 inclusive, and 27-36 inclusive. Of these compounds, compound No. 3 is especially preferred.

Preparation of compound No. 3, 1,2-bis [4-(1,3-dimethylbutylamino)phenoxy] ethane, is shown in Example I, following.

EXAMPLE I

Into a suitable reactor equipped with an agitator, a condenser, a thermowell and facilities for heating and cooling were charged 200 grams of ethylene glycol, 84.1 grams of p-nitrophenol, and 40 grams of 85% KOH. The mixture was agitated at ambient temperature until the KOH had reacted. At that time 56.9 grams of ethylene dichloride was charged slowly, so as to maintain a pot temperaure of 135°-140° C. After the feed was completed, the reaction temperature was maintained for another three hours.

The reaction mass was then cooled to 25° C. and the resultant slurry was centrifuged to remove the filtrate for recycling. The wet cake was washed with 200 grams of water, and the cake was again centrifuged.

The wet cake, weighing 82.6 grams (77.6 grams being the bis nitro compound) was charged to an autoclave equipped with coils for heating and cooling, a rupture disc, an agitator and a thermocouple. Added to the cake were 60 grams of methyl isobutyl ketone and 2.0 grams each of 1% platinum-on-carbon catalyst and a pulverized acidic carbon catalyst. The autoclave was purged with $N_2$ twice and with $H_2$ once. The contents were heated to 100° C. and hydrogen pressure (ten atmospheres) applied until a controlled nitro reaction occurred. When the nitro group was reduced, as indicated by a temperature drop, the pressure was raised to 25 atmospheres and the temperature was maintained at 100° to 120° C. The alkylation reaction was followed by GLC analysis until alkylation was complete. The batch was cooled to 70° C., filtered and removed to a stripping still. The still pot was heated to 160° C. under 20 mm Hg vacuum to remove water and ketone. The batch was then cooled to 75° C. and removed. The product was an oily liquid, which solidified on cooling, having a melting point of 53°–55° C. NMR spectra of the product was consistent with the structure of 1,2-bis [4-(1,3-dimethylbutylamino)phenoxy] ethane.

EXAMPLE II

In order to evaluate the compositions and compounds of the invention, rubber ozone resistance data were obtained for several vulcanized rubber samples according to the Stress Relaxation Method, described above.

The formulation used for the tests was the following, based on natural rubber:

| Material | Parts by Weight |
|---|---|
| Natural Rubber | 100.0 |
| HAF Carbon black | 40.0 |
| Aromatic oil | 10.0 |
| Zinc oxide | 5.0 |
| Stearic acid | 1.0 |
| Wax | 2.0 |
| Sulfur | 2.5 |
| Accelerator (N-tert-butyl-2-benzothiazole sulfenamide) | 0.6 |
| Antidegradant | 0, 1.0, 3.0 |

Test samples were prepared and vulcanized, incorporating as the antidegradant the following materials:

| SAMPLE CODE | FORMULA |
|---|---|
| A | 1,2-bis[4-(1,3-dimethylbutylamino)phenoxy] ethane |
| B | 1,2-bis[4-(isopropylamino)phenoxy] ethane |
| C | 1,2-bis[4-(cyclohexylamino)phenoxy] ethane |
| Z | 1,2-bis[4-(phenylamino)phenoxy] ethane |

Results of testing for ozone resistance are set forth in Table I, below. The figures are reported for dynamic, intermittent, and aged intermittent testing. The numbers in the table represent the hours until the force required to extend each test piece reached 90%, 80% and 70%, respectively, of the original force. Results are shown for samples containing 1.0 and 3.0 parts of each of the antidegradants, and a control sample with no antidegradant.

TABLE I

| | CONTROL | Antidegradant, Parts | | | | | | | |
|---|---|---|---|---|---|---|---|---|---|
| | | A | | B | | C | | Z | |
| Test Mode | 0 | 1 | 3 | 1 | 3 | 1 | 3 | 1 | 3 |
| Dynamic: | | | | | | | | | |
| 90% | 5 | 9 | 21 | 9 | 9 | 10 | 10 | 5 | 5 |
| 80% | 9 | 18 | 45 | 18 | 19 | 21 | 22 | 10 | 9 |
| 70% | 13 | 30 | 69 | 29 | 32 | 33 | 37 | 15 | 13 |
| Intermittent: | | | | | | | | | |
| 90% | 5 | 11 | 18 | 9 | 10 | 13 | 11 | 5 | 5 |
| 80% | 8 | 24 | 33 | 18 | 19 | 21 | 22 | 10 | 10 |
| 70% | 12 | 36 | 64 | 26 | 30 | 29 | 35 | 14 | 14 |
| Aged Intermittent: | | | | | | | | | |
| 90% | 4 | 7 | 12 | 6 | 16 | 6 | 11 | 5 | 5 |
| 80% | 7 | 13 | 29 | 13 | 27 | 11 | 25 | 10 | 9 |
| 70% | 10 | 20 | 54 | 21 | 41 | 17 | 37 | 14 | 13 |

Analysis of the data in Table I indicates that samples A, B and C all show significantly better performance under ozone attack than the control. Sample Z did not appear to perform any better than the control. Comparing A, B and C, the best all-around performance was obtained with A, especially at the 3.0 part level. Sample C was generally slightly better than B, except in the aged intermittent test. In summary, samples A, B and C were effective antidegradants in the test, while Z was not.

EXAMPLE III

In another evaluation, several of the compositions and compounds of the invention were compared as in Example II above; however, in this instance, the rubber composition was 50/50 natural rubber/cis-1,4-polybutadiene.

The rubber formulation was as follows:

| Material | Parts by Weight |
|---|---|
| Natural rubber | 50 |
| cis-1,4-polybutadiene | 50 |
| HAF carbon black | 50 |
| Aromatic oil | 10 |
| Zinc oxide | 3 |
| Stearic acid | 1 |
| Wax | 2.5 |
| Sulfur | 2 |
| Accelerator (N-tert-butyl-2-benzothiazolesulfenamide) | 1.0 |
| Antidegradant | 2.0 |

Test samples were prepared and vulcanized, using the following materials as antidegradants:

| SAMPLE CODE | FORMULA |
| --- | --- |
| S | N-(1,3-dimethylbutyl)-N'-phenyl-p-phenylene diamine |
| T | 1,5-bis[4-(isopropylamino)phenoxy] pentane |
| U | 1,2-bis[4-(isopropylamino)phenoxy] ethane |
| V | 1,2-bis[4-(1,3-dimethylbutyl-amino)phenoxy] ethane |
| W | 1,5-bis[4-(1,3-dimethylbutyl-amino)phenoxy] pentane |

(Sample S is a commercial antiozonant, outside the scope of the invention).

The samples were tested for ozone resistance as in Example II. A control sample containing no antidegradants was also tested.

The test data are set forth in Table II, following.

TABLE II

| TEST MODE | CONTROL | S | T | U | V | W |
| --- | --- | --- | --- | --- | --- | --- |
| Dynamic: | | | | | | |
| 90% | * | 25 | 14 | 4 | 7 | 17 |
| 80% | * | 40 | 26 | 8 | 16 | 18 |
| 70% | * | 50 | 36 | 12 | 25 | 24 |
| Intermittent: | | | | | | |
| 90% | * | 25 | 48 | 14 | 22 | 18 |
| 80% | * | 74 | ** | 23 | ** | 35 |
| 70% | * | 78 | ** | 30 | ** | ** |
| Aged Dynamic: | | | | | | |
| 90% | 3 | 16 | 13 | 6 | 8 | 4 |
| 80% | 6 | 25 | 24 | 12 | 17 | 8 |
| 70% | 9 | 31 | 35 | 19 | 26 | 16 |
| Aged Intermittent: | | | | | | |
| 90% | 5 | 35 | 29 | 16 | 27 | 11 |
| 80% | 13 | 61 | 59 | 31 | 48 | 21 |
| 70% | ** | ** | 63 | ** | 64 | 28 |

*means sample broke before 16 hours.
**means sample broke before the indicated percentage was reached.

The data in Table II show that a substantial increase in ozone resistance over the control was shown by all the samples tested. Samples T and V showed ozone resistance which was roughly equivalent to that of sample S, the commercial antiozonant.

It can be seen that the rubber compositions of the invention have a significantly improved ozone resistance over unprotected controls, and over a composition which is outside the scope of this invention. The preferred novel compounds, as exemplified by 1,2-bis [4-(1,3-dimethylbutylamino)phenoxy] ethane, demonstrate outstanding antiozonant activity, when incorporated in rubber compounds in stabilizing amounts.

Although the invention has been illustrated by typical examples, it is not imited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. Vulcanizable diene rubber having incorporated therein a stabilizing amount of a compound according to the formula

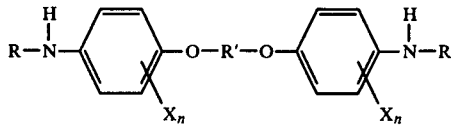

wherein the Rs are the same or different secondary alkyl radicals, including cyclic alkyls, of from 3 to 8 carbons, R' is a divalent straight or branched chain alkyl radical of from 1 to 6 carbon atoms, X is lower alkyl or halogen, and n is an integer of 0 to 4.

2. The composition of claim 1, wherein both Rs are 1,3-dimethylbutyl.

3. The composition of claim 1, wherein both Rs are isopropyl.

4. The composition of claim 1, wherein R' is ethylene.

5. The composition of claim 1, wherein R' is pentamethylene.

6. The composition of claim 1, wherein the rubber is vulcanized.

7. The composition of claim 1, wherein the compound is 1,2-bis [4-(1,3-dimethylbutylamino)phenoxy] ethane.

* * * * *